United States Patent [19]

Papanikolau et al.

[11] Patent Number: 4,804,422

[45] Date of Patent: Feb. 14, 1989

[54] METHOD OF PURIFYING QUARTZ SAND

[75] Inventors: Emmanuel Papanikolau; Leonard T. M. Ebben, both of Eindhoven, Netherlands

[73] Assignee: U.S. Philips Corporation, New York, N.Y.

[21] Appl. No.: 877,601

[22] Filed: Jun. 23, 1986

[30] Foreign Application Priority Data

Feb. 6, 1986 [NL] Netherlands .......................... 8600283

[51] Int. Cl.$^4$ ............................................... B08B 3/00
[52] U.S. Cl. ......................................... 134/28; 134/3; 134/25.1; 134/30; 134/36; 502/408; 502/409; 423/340; 423/341
[58] Field of Search .................. 134/3, 25.1, 28, 30, 134/36; 502/408, 409; 423/340, 341, 149, 150

[56] References Cited

U.S. PATENT DOCUMENTS

| | | | |
|---|---|---|---|
| 1,219,438 | 3/1917 | Cotlin | 502/408 |
| 2,502,337 | 3/1950 | Moir | 134/3 |
| 2,666,001 | 1/1954 | Marshall | 134/3 X |
| 2,734,837 | 2/1956 | Hands | 134/28 X |
| 4,101,309 | 7/1978 | Koseki et al. | 134/3 X |
| 4,477,364 | 10/1984 | Garcia | 134/28 X |

FOREIGN PATENT DOCUMENTS

| | | | |
|---|---|---|---|
| 249803 | 1/1960 | Australia | 423/340 |
| 594783 | 3/1960 | Canada | 423/340 |
| 604060 | 8/1960 | Canada | 423/340 |
| 0130808 | 1/1985 | European Pat. Off. | 423/340 |
| 45-23605 | 8/1970 | Japan | 423/340 |
| 47626 | 10/1963 | Poland | 423/34 |
| 555241 | 8/1943 | United Kingdom | 423/340 |
| 1223177 | 2/1971 | United Kingdom | 423/340 |

Primary Examiner—Asok Pal
Attorney, Agent, or Firm—Paul R. Miller

[57] ABSTRACT

Starting from pegmatitic sand, the invention provides a method of purifying quartz sand, in which the amount of iron is reduced to less than 0.3 ppm, the amount of zircon to less than 1 ppm, and the amount of phosphor to less than 0.2 ppm. Gas nuclei are also removed. The method is carried out by washing with solution which contains at least 15% by weight of HF in water until at least 40% by weight of the quartz sand is dissolved, and washing with a solution which contains at least 20% by weight of HCl in water at a temperature from 5° to 95° C. for at least 30 minutes. In this method, the grains of the sand are freely suspended in an upward stream of the acid. Such quartz sand can suitably be used for the manufacture of very pure quartz glass for use in mercury discharge lamps, in glass fibers for telecommunication purposes (cladding glass), or in semiconductor arrangements.

4 Claims, 1 Drawing Sheet

METHOD OF PURIFYING QUARTZ SAND

The invention relates to a method of purifying quartz sand in order to remove gas nuclei and impurities. In particular iron and iron compounds are removed by causing the sand to react with at least hydrofluoric acid, in which method the quartz sand is preferably first cleared of free impurities, for example, by means of a flotation process which is known per se or by means of magnetic separations.

Quartz sand which is used for the manufacture of quartz glass must be of great purity to be suitable for use in mercury discharge lamps, for example, in cladding glass in glass fibers for telecommunication purposes, or in semiconductor arrangements. Besides free impurities between the sand grains, natural quartz sand generally also contains impurities which are present in or on the grains. German patent specification DE No. 2431928 describes a method of purifying quartz sand by treating it with hydrofluoric acid and sulphuric acid, in which, for example, the iron content is reduced to less than 50 ppm (parts by weight) and the yield is from 95 to 98% by weight of the starting material.

A disadvantage of the above-described method is that 50 ppm is still too high a content for many applications. Iron is present in the form of metallic iron or steel particles and in the form of iron-containing minerals. Upon processing quartz sand into quartz glass, the material is usually molten in an atmosphere which mainly contains hydrogen in order to be able to manufacture quartz glass which is free from bubbles. In this process the iron compounds are reduced thereby forming metallic nuclei around which a local crystallization of the quartz glass takes place. This causes Rayleigh scattering of light (brown discolouration), even if the amount of iron is so small that absorption by iron and iron compounds does not play a role as yet. Copper and nickel compounds may give rise to the same problem.

Phosphorus is a further disadvantageous impurity which is mostly present in the form of phosphates. It causes the formation of drop-like areas in the quartz glass which look like small bubbles. During melting quartz sand phosphorus vapours may attack the walls of the oven, particularly if the walls contain molybdenum. It is possible to incorporate phosphorus in the quartz-glass lattice by melting at a high temperature but the great amount of time that is necessary therefor and the high temperature generally form an obstacle, for example, because of the high energy consumption and the corrosive action. Phosphorus, and also compounds of antimony and arsenic, are extremely undesirable in quartz glass which is used as a substrate material for a semiconductor device because of the possible diffusion of these impurities into the semiconductor material.

An impurity which in quartz sand induces a phase separation and, thus, the formation of inclusions, is zircon, for example, in the form of the very inert zircon orthosilicate. The inclusions lead to, for example, breakage of the glass fibers when the quartz glass is used as a cladding glass.

It is an object of the invention to provide a method of purifying quartz sand, in which the amount of iron is reduced to less than 0.3 ppm, the amount of zircon is reduced to less than 1 ppm and the amount of phosphorus is reduced to less than 0.2 ppm. The terms iron, zircon and phosphorus also include compounds of the elements. The amount mentioned is the part by weight of the relative element in quartz sand.

A further object of the invention is to provide a method in which a cheap starting material, such as, for example, pegmatitic sand can be used.

Another object of the invention is to provide a method of purifying quartz sand, such that a type of quartz glass can be manufactured which is substantially free from bubbles and which is not subject to a brown discolouration.

This object is achieved in accordance with the invention by a method as described in the opening paragraph, which is characterized in that it comprises the following steps in the indicated sequence:
washing with a solution which contains at least 15% by weight of HF in water until at least 40% by weight of the quartz sand is dissolved
washing with a solution which contains at least 20% by weight of HCl in water at a temperature from 50° to 95° C. for at least 30 minutes.

In a preferred embodiment of the method in accordance with the invention, the first step is carried out with a solution of at least 30% by weight of HF for at least 30 minutes.

In an extremely efficient embodiment of the method in accordance with the invention, both steps are carried out by passing the acids through an amount of quartz sand in an upward direction at such a rate that the sand grains are freely suspended, the grains of the quartz sand used having maximum dimensions smaller than 1 mm, and the volume ratio between the sand and the acid being between 1:40 and 1:3 in the space where the sand is situated.

The invention is based on the experimentally established phenomenon that during washing with HF having a minimum concentration of 15% by weight, the sand particles are etched, preferentially, along the grain boundaries, such as, for example, along the boundaries of twin crystals. In this case, grain boundaries are to be understood to mean the boundaries between the crystallites from which the sand particles are formed. The impurities and gas nuclei become accessible because it has been found that impurities and gas nuclei are present on the grain boundaries. iron and iron compounds are dissolved, among others. Suprisingly it has been found that even inert ziron compounds are substantially etched away.

During grinding the sand, breakage takes place, preferentially, along the impurities and gas nuclei which are, consequently exposed and can be chemically treated. Small gas bubbles, which are not located at the surface or along the grain boundaries, are also removed very effectively. By etching, a crystal conglomerate is formed having an irregular weak structure. Upon heating sand to a temperature over 700° C. (calcining) the pressure of the remaining small gas nuclei increases to such an extent that the structure bursts and the gas is set free.

In order to sufficiently remove the impurities from the grain boundaries, it is necessary to etch away at least 40% by weight of the starting material. The present method is still efficient because the starting material is a lot cheaper, and even when the cost of the washing process and the lost material is taken into account the product can compete with other sources of pure quartz sand, such as, for example, rock crystal.

The second step in the method serves mainly to remove phosphates which have become more accessible to the hydrochloric treatment thanks to the preceding hydrofluoric acid treatment.

An example of an embodiment of the method in accordance with the invention is explained in greater detail with reference to a drawing, in which

EXAMPLE OF AN EMBODIMENT

Figure 1:
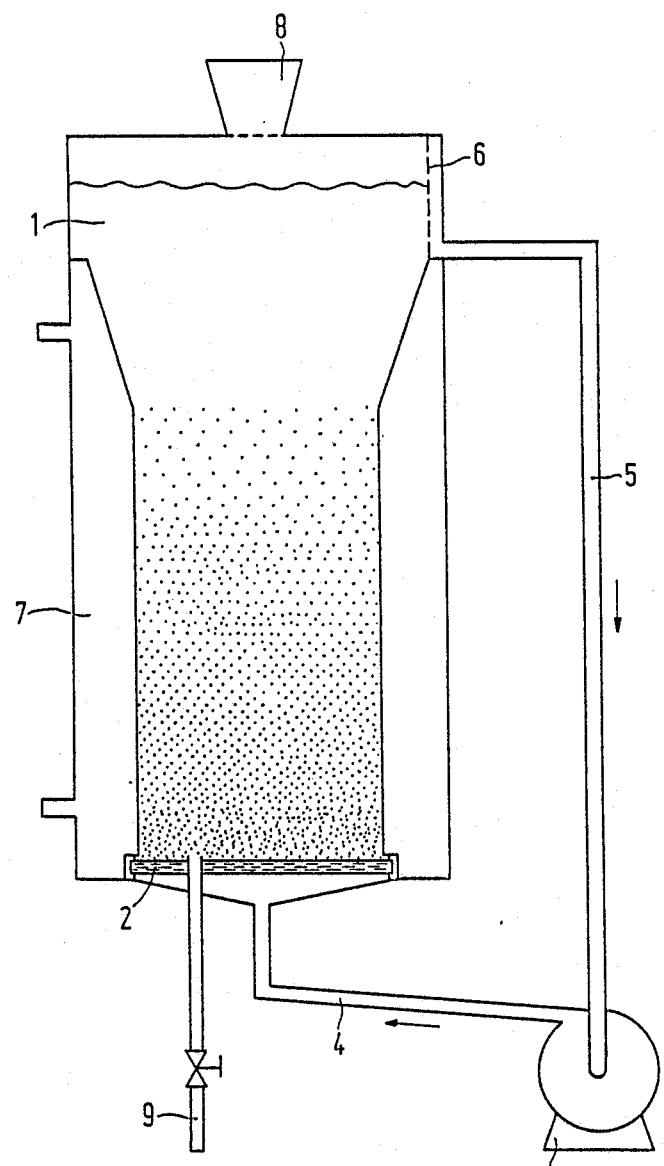
FIG. 1 is a schematic sectional view of an arrangement in which the method can be carried out.

In the present example, pegmatitic sand is used as the starting material with the maximum dimension of the sand grains being 0.5 mm. In order to attain this size the quartz sand may be ground in a known way prior to the purification process. A part of the free impurities, such as feld spars, is removed by means of flotation in a liquid mixture having a suitable specific weight, if necessary, in a centrifuge to accelerate the process. Metal particles can, for example, also be removed magnetically.

One of the impurities in quartz sand is iron which together with nickel, for example, is present in a metallic form due to wear of tools used to work up the sand. Iron is also present in minerals, for example, in bixbyite and in iron-containing aluminosilicates, such as spessartite, biotite and epidote. In the present example the total amount of iron, measured as an element, amounts to 21 ppm (parts by weight), the amount of nickel is 1.4 ppm. Phosphorus in an amount of 4 ppm forms a further impurity, predominantly in the form of phosphates such as monazite and xenotime. The quartz sand contains 2.5 ppm of zircon, among others, in the form of the very inert zircon orthosilicate, 0.4 ppm lanthanum and 1400 ppm sodium in various minerals. The mineral impurities which are contained in the grains as crystals generally have a maximum dimension of from 30 to 100 $\mu$um.

FIG. 1 shows a vessel 1 having in its bottom a porous plate, such as a carbon filter 2. By a pump 3 an amount of acid is led through the supply pipe 4 to the bottom side of the filter 2. Over the filter 2 there is the quartz sand to be purified. By a return pipe 5 the acid is led back to the pump 3. Between the vessel 1 and the return pipe 5 there is a filter 6, for example, of polytetrafluorethylene to prevent the grains from being carried to the pump 3. The vessel 1 is provided with a jacket 7 for the inculation of a cooling or heating liquid. The vessel 1 is further provided with a filler opening 8 through which the sand to be washed is introduced and with a sand drain 9. Moreover, the arrangement may also be provided with supply and draining devices (not shown) for the acid and for rinsing water and with measuring and control equipment to monitor and control the process. The vessel and the pipes are preferably made of an inert synthetic resin material, such as polytetrafluorethylene or polypropylene.

In accordance with the example the following method is adopted. In a first step an amount of quartz sand is washed using a 40% by weight solution of HF in water for 30 minutes at a temperature of 50° C. The temperature tends to rise due to the exothermal reaction of the quartz sand with the hydrofluoric acid, and consequently, the vessel is cooled to maintain the temperature of the acid substantially constant. In an intermediate step, the quartz sand is rinsed with demineralized water. In the second purification step, the quartz sand is washed using a 30% by weight solution of HCl in water for 60 minutes at a temperature of 80° C. In both purification steps the volume ratio between sand and acid in the vessel is 1:20.

During the washing steps the grains of sand are preferably freely suspended so as to ensure that each individual particle is adequately treated over its entire surface area by the acid.

The output of the purification process is 45% by weight of the starting material. An analysis of the quartz sand thus purified shows the following result: 0.07 ppm of iron, less that 0.07 ppm of nickel, 0.1 ppm of phosphor, 8 ppm of zircon, 0.014 ppm of lanthanum and 0.5 ppm of sodium.

In an alternative embodiment of the method in accordance with the invention, the sand and the acid can also be contacted in another way, for example, by stirring them together in a vessel.

The output and the degree of purification obtained are dependent upon the concentration of the hydrofluoric acid and upon the duration of the first purification step. The desired value of this parameter can easily be established by experiments and, when necessary, adapted. In this respect it is to be noted that the output decreases as the purity increases. The concentration of the hydrofluoric acid should be at least 15% by weight in order to ensure a sufficient degree of etching of the sand grains. The temperature influences the duration of the first purification step but the purity obtained is dependent upon the amount of dissolved material.

In the second purification step a concentration of at least 20% by weight of hydrochloric acid is required to make the phosphates dissolve. If the concentration is chosen to be higher, the processing time can be shorter. Preferably, the temperature is higher than 50° C. in order to obtain a sufficiently high dissolution rate of the phosphates. The temperature is preferably lower than 95° C., which is necessary to avoid the use of special provisions and safety devices in the arrangement because of boiling.

If desired, the purified quartz sand can be cleared in the same arrangement of sulfides, for example, by subjecting it to a treatment with concentrated nitric acid. In this case the vessel is preferably made of polytetrafluorethylene.

Quartz sand can suitably be made molten and formed into quartz glass, for example, in a hydrogen atmosphere for 20 minutes at a temperature of 2200° C., after which the hydrogen is removed from the product, by firing, for example, for 12 hours at 1150° C. The quartz glass obtained does not exhibit a brown discolouration and only contains a very small amount of bubbles.

The quartz glass can suitably be used, for example, in glass fibers for telecommunication purposes, as cladding glass of the fibers, in lamps, such as in particular, in mercury discharge lamps, and in semiconductor arrangements, such as a substrate material.

What is claimed is:

1. A method of purifying quartz sand comprising the steps of first, removing various free impurities from quartz sand, thereafter, washing said quartz sand with a solution of at least 15% by weight of HF in water until at least 40% by weight of said quartz sand is dissolved, and then, washing the remaining quartz sand with a solution containing at least 20% by weight of HCl in water at a temperature from 50° to 95° C. for at least 30 minutes.

2. A method according to claim 1, wherein said step of washing said quartz sand with HF is carried out for at least 30 minutes, and said solution contains at least 30% by weight of HF.

3. A method according to claim 2, wherein both said steps of washing are carried out by passing said HF and said HCl upwardly through said quartz sand, said quartz sand having grains freely suspended, and said grains having maximum dimensions smaller than 1 mm, and wherein said quartz sand and said HF and said HCl, respectively, have a volume ratio of between 1:40 and 1:3 in said quartz sand.

4. A method according to claim 1, wherein both said steps of washing are carried out by passing said HF and said HCl upwardly through said quartz sand, said quartz sand having grains freely suspended, and said grains having maximum dimensions smaller than 1 mm, and wherein said quartz sand and said HF and said HCl, respectively, have a volume ratio of between 1:40 and 1:3 in said quartz sand.

* * * * *